(12) United States Patent
Ding et al.

(10) Patent No.: US 11,622,025 B2
(45) Date of Patent: Apr. 4, 2023

(54) TECHNIQUES IN RETRIEVING CACHED CONTENT USING INFORMATION CENTRIC NETWORKING FOR PROTOCOL DATA UNIT SESSIONS

(71) Applicant: Apple Inc., Cupertino, CA (US)

(72) Inventors: Zongrui Ding, Portland, OR (US); Gabriel Arrobo Vidal, Hillsboro, OR (US); Qian Li, Beaverton, OR (US); Geng Wu, Portland, OR (US); Ching-Yu Liao, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/289,580

(22) PCT Filed: Nov. 1, 2019

(86) PCT No.: PCT/US2019/059440
§ 371 (c)(1),
(2) Date: Apr. 28, 2021

(87) PCT Pub. No.: WO2020/092933
PCT Pub. Date: May 7, 2020

(65) Prior Publication Data
US 2022/0014600 A1 Jan. 13, 2022

Related U.S. Application Data

(60) Provisional application No. 62/768,763, filed on Nov. 16, 2018, provisional application No. 62/755,146, filed on Nov. 2, 2018.

(51) Int. Cl.
| | | |
|---|---|---|
| *G06F 15/16* | (2006.01) | |
| *H04L 67/563* | (2022.01) | |
| *H04W 76/10* | (2018.01) | |
| *H04L 45/00* | (2022.01) | |
| *H04L 67/561* | (2022.01) | |
| *H04L 67/568* | (2022.01) | |

(52) U.S. Cl.
CPC ............ *H04L 67/563* (2022.05); *H04L 45/38* (2013.01); *H04L 67/561* (2022.05); *H04L 67/568* (2022.05); *H04W 76/10* (2018.02)

(58) Field of Classification Search
None
See application file for complete search history.

(56) References Cited

U.S. PATENT DOCUMENTS

| | | | |
|---|---|---|---|
| 2018/0091615 A1* | 3/2018 | Seedorf | H04L 9/3247 |
| 2018/0146071 A1* | 5/2018 | Himayat | H04L 41/5006 |

(Continued)

FOREIGN PATENT DOCUMENTS

WO  WO 2017/184528 A2  10/2017

OTHER PUBLICATIONS

International Preliminary Report and Written Opinion directed to related International Application No. PCT/US2019/059440, dated Feb. 25, 2020, 11 pages.

(Continued)

*Primary Examiner* — Brian Whipple
*Assistant Examiner* — Gregory P Tolchinsky
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for retrieving cached data in an information centric networking (ICN) enabled cellular network. Various embodiments enable cached ICN data retrieval with newly introduced functionalities, such as ICN-control function (ICN-CF), ICN-point of attachment (ICN-PoA), uplink classifier (UL CL), and other corresponding functionalities. Other embodiments may be described and claimed.

19 Claims, 12 Drawing Sheets

(56) References Cited

U.S. PATENT DOCUMENTS

| | | | |
|---|---|---|---|
| 2018/0241679 A1* | 8/2018 | Muscariello | H04L 67/327 |
| 2018/0270300 A1 | 9/2018 | Reznik et al. | |
| 2019/0081890 A1* | 3/2019 | Ravindran | H04L 67/327 |
| 2020/0076764 A1* | 3/2020 | Robitzsch | H04L 67/10 |
| 2020/0100303 A1* | 3/2020 | Sankar | H04W 76/12 |
| 2021/0014765 A1* | 1/2021 | Shan | H04W 8/02 |
| 2021/0289390 A1* | 9/2021 | Zhou | H04L 47/20 |

OTHER PUBLICATIONS

R. Ravindran et al., "Enabling ICN in 3GPP's 5G NextGen Core Architecture", draft-ravi-icnrg-5gc-icn-01, ICNRG, Active Internet-Draft (individual), Feb. 27, 2018, 25 pages.

"5G; System Architecture for the 5G System (3GPP TS 23.501 version 15.3.0 Release 15)", ETSI TS 123 501 V15.3.0, Sep. 27, 2018, 227 pages.

G. White et al., "Internet Protocol Tunneling over Content Centric Mobile Networks", draft-irtf-icnrg-ipoc-00, ICNRG, Active Internet-Draft (individual), Dec. 28, 2017, 14 pages.

International Preliminary Report on Patentability directed to related International Patent Application No. PCT/US2019/059440, dated Apr. 27, 2021; 9 pages.

3GPP, "3rd Generation Partnership Project; Technical Specification Group Services and System Aspects; Procedures for the 5G System; Stage 2 (Release 15)," 3GPP TS 23.502 V15.3.0 (Sep. 2018), 330 pages.

\* cited by examiner

TECHNIQUES IN RETRIEVING CACHED CONTENT USING INFORMATION CENTRIC NETWORKING FOR PROTOCOL DATA UNIT SESSIONS

CROSS REFERENCE TO RELATED APPLICATION

The present application is a U.S. National Phase of International Application No. PCT/US2019/059440, filed Nov. 1, 2019, which claims priority to U.S. Provisional Patent Application No. 62/755,146 filed Nov. 2, 2018, entitled "Supporting Information Centric Networking in Next Generation Cellular Networks (Beyond 5G)," and U.S. Provisional Patent Application No. 62/768,763, filed Nov. 16, 2018, entitled "Enabling Cached Content Retrieving Using Information Centric Networking (ICN) for PDU Sessions to Reduce Latency in Next Generation Cellular Networks," all of which are hereby incorporated by reference in their entireties.

FIELD

Embodiments of the present invention relate generally to the technical field of wireless communications.

BACKGROUND

The background description generally presents the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section. An existing network architecture is host-centric and based on Internet protocol (IP).

Thus, the communications in such a network is host-to-host and corresponding content delivery may rely on sessions between the two hosts and/or end points. Associated maintenance of these end-to-end sessions may be complex and prone to errors. In addition, bottlenecks may be generated in multiple places in the network if, for example, multiple users request the same content in the same time and the network does not have knowledge or is aware of such information. Similar situations like this may cause less-than-optimal utilization of link resources. Further, it may not be possible to the content among different users that request the content.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
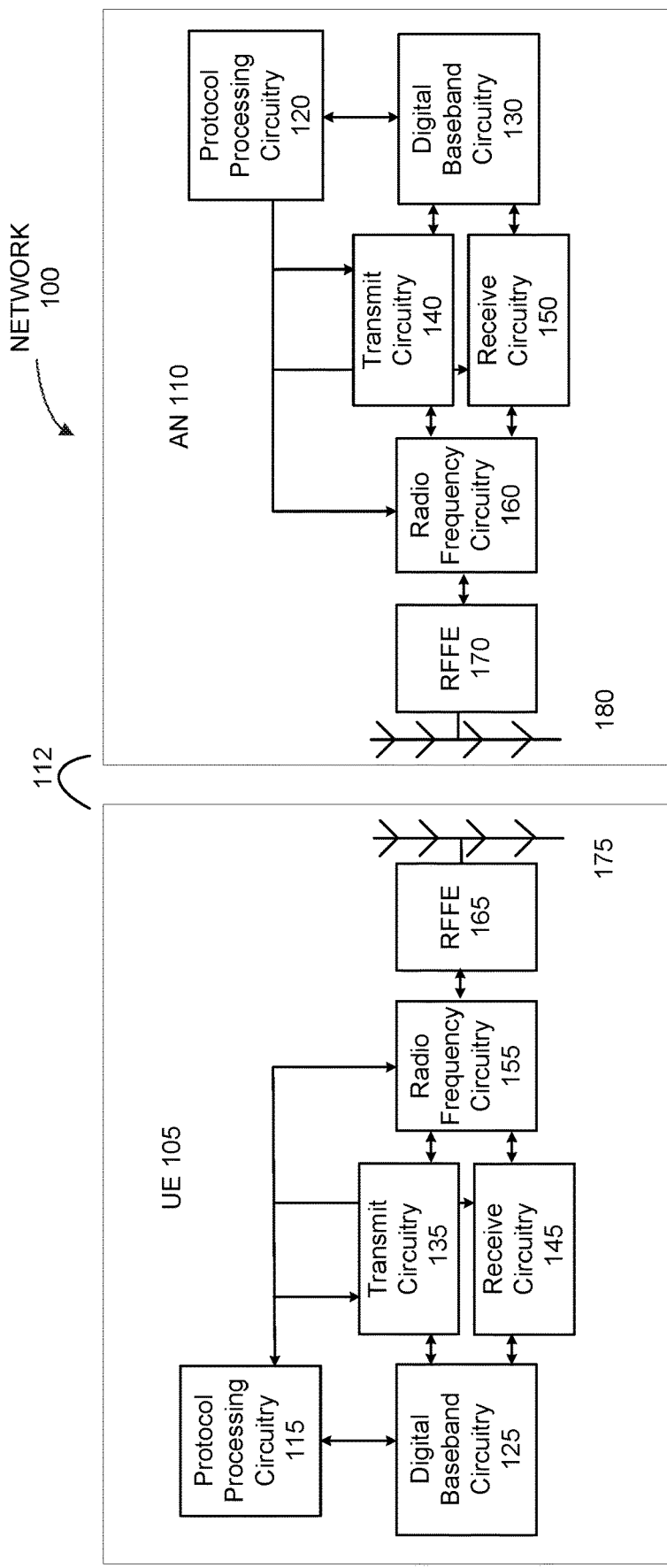
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

In Fifth Generation Systems (5GS), delays may not be predictable when a UE requests certain content via a protocol data unit (PDU) session. Those delays may be caused by various reasons. For example, some delay introduced by a route taken from a base station to an anchor user plane function (UPF) may vary due to different networks and/or areas. In addition, some delay introduced from the anchor UPF to a data host (e.g., YouTube® server) may be uncertain due to the best effort nature of internet or network. An uplink (UL) classifier (CL) branching PDU session may leverage some capabilities that have been deployed near network edges (e.g., edge computing capabilities) to reduce corresponding latency of data retrieval.

Information centric networking (ICN) may enable efficient content exchange and reduce the above mentioned latency by utilizing cached data that are already stored in cellular network, if the ICN is used in the cellular network. The ICN may leverage its caching capabilities and make the desired content arbitrarily available in the cellular network at ICN nodes. However, the cached content, as part of the ICN stack, may not be retrieved from or by a PDU session with existing technologies, because, for example, current architecture of UL CL branching PDU sessions may not support pulling data from ICN nodes, and/or the ICN data may be identified by a name (e.g., uniform resource identifier (URI)), which needs to be passed from an application level to an ICN node. Thus, an ICN interest packet associated with the name of the content (e.g., a prefix) may be generated and sent to pull the requested content. Various embodiments herein describe how to enable ICN data retrieving for a PDU session, which may reduce the abovementioned latency and/or improve communication efficiencies. New network architecture may be introduced to enable the ICN data retrieving.

FIG. 1 schematically illustrates an example wireless network 100 (hereinafter "network 100") in accordance with various embodiments herein. The network 100 may include a UE 105 in wireless communication with an AN 110. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.). The AN 110 can enable or terminate the connection 112. The AN 110 can be referred to as a base station (BS), NodeB, evolved-NodeB (eNB), next-generation eNB (ng-eNB), next-generation NodeB (gNB or ng-gNB), NG-RAN node, cell, serving cell, neighbor cell, primary cell (PCell), secondary cell (SCell), primary SCell (PSCell), and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio resource control (c), radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry shown in FIGS. 3A and 3B. The UE 105 may include protocol processing circuitry 115, which may implement one or more layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
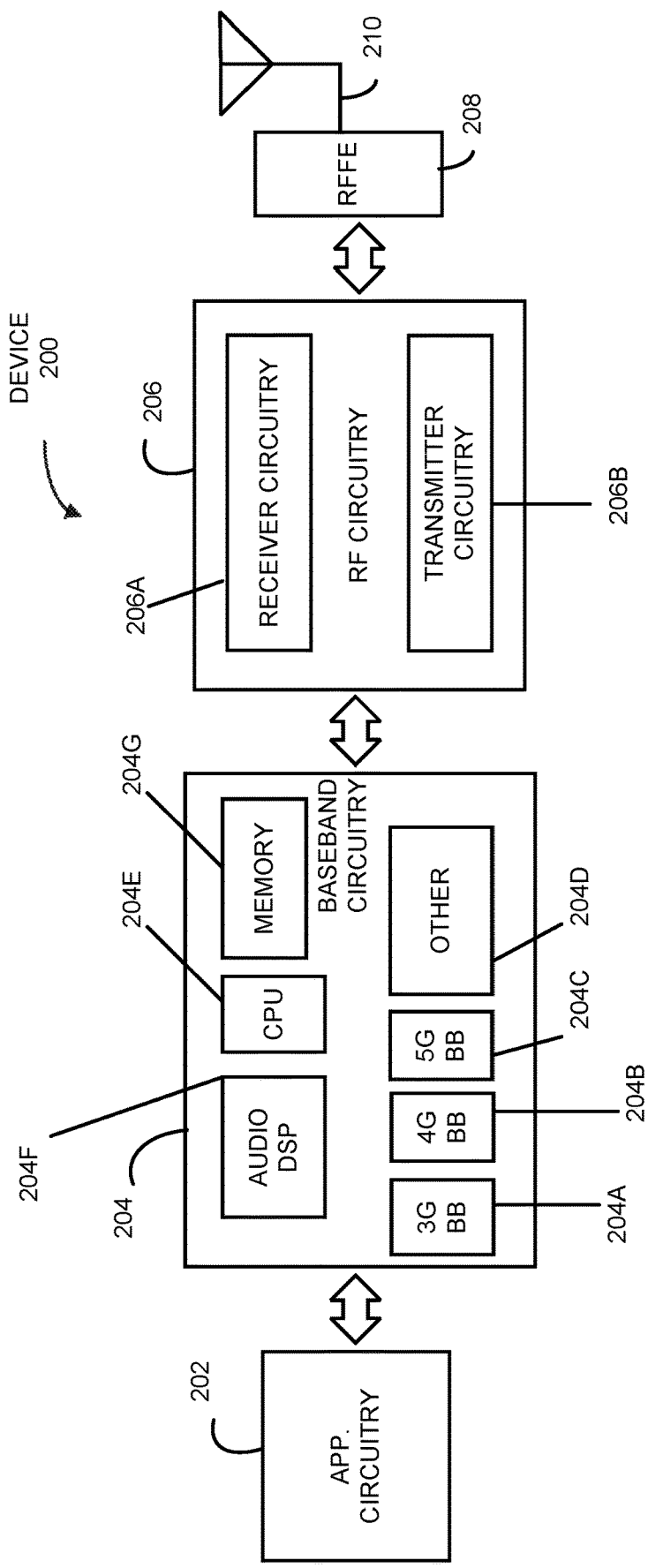
FIG. 2 illustrates example components of a device in accordance with various embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3A/3B, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam.

The AN 110 may generate and transmit a message to include a measurement gap configuration according to various embodiments herein. The UE 105 may decode the message transmitted by the AN 100 to determine a starting point of the configured measurement gap, according to various embodiments herein.

FIG. 2 illustrates example components of a device 200 in accordance with some embodiments. In contrast to FIG. 1, FIG. 2 illustrates example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, a cell may not utilize the application circuitry 202, and instead include a processor/controller to process IP data received from an EPC). In some embodiments, the device 200 may include additional elements such as, for example, a memory/storage, display, camera, sensor, or input/output (I/O) interface.

In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) and/or NR baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

Figure 3:
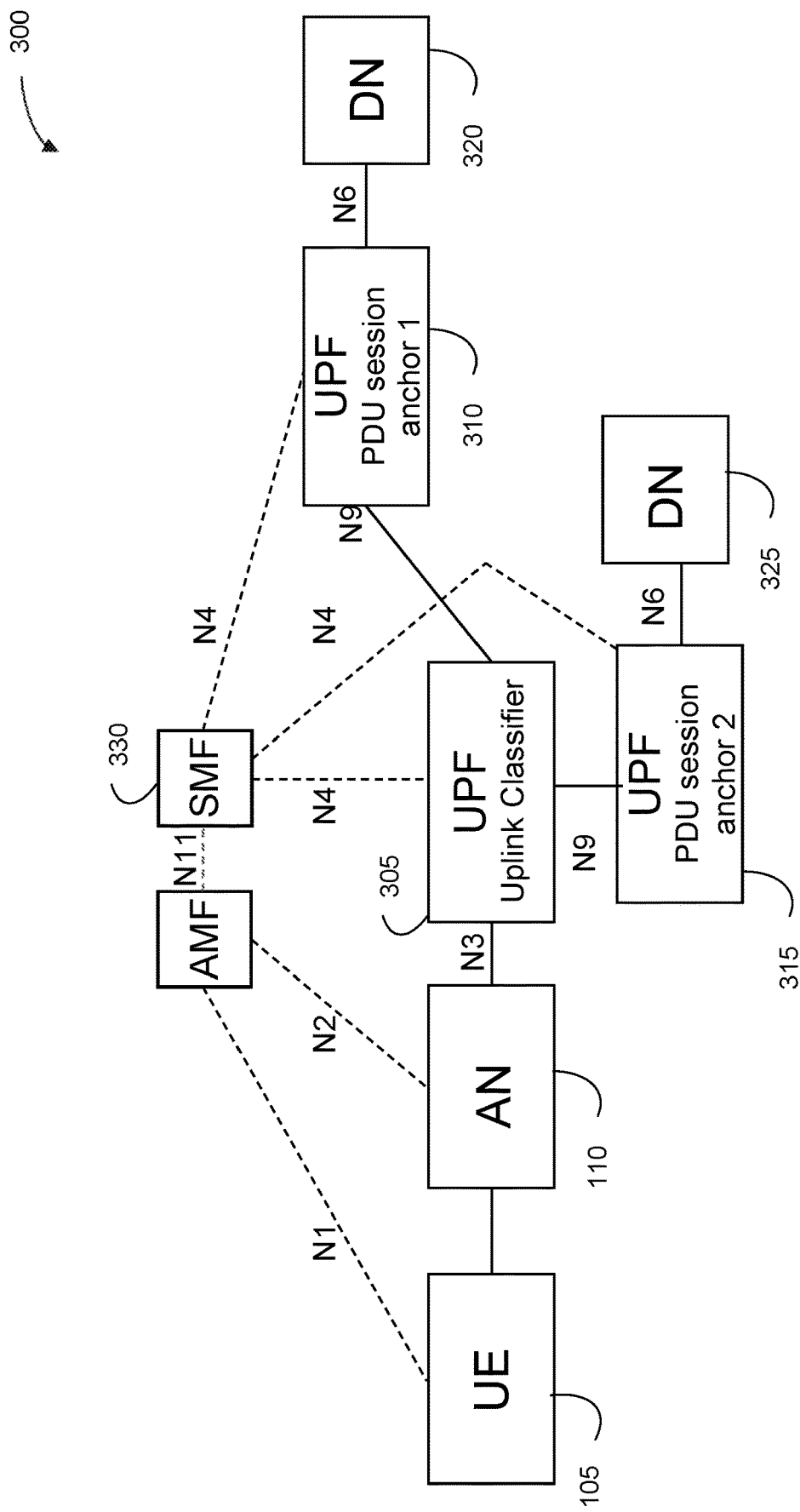
FIG. 3 illustrates an example architecture in 5G system, in accordance with various embodiments.

FIG. 3 illustrates an example architecture 300 in 5G system, in accordance with various embodiments. The architecture may include the UE 105 and AN 110. A UL CL 305 may be used to branch data traffics from the UE 105 to a PDU session anchor 1 310 and another PDU session anchor 2 315. The UL CL 305 may be associated with a UPF. The PDU session anchors 1 and 2 310/315 may be coupled to respective data networks (DNs) 320/325. In some embodiments, the DN 325 may be the same DN as the DN 320 but via a local access for the UE 105. The UL CL 305 may be a functionality supported by the corresponding UPF that aims at diverting some traffic matching traffic filters provided by a session management function (SMF) 330. The SMF 330 may determine corresponding insertion and/or removal of the UL CL 305 using general N4 and UPF capabilities. A particular UE traffic may be steered by the UL CL 305 to the two DNs 320 and 325. The UL CL 305 may forward the UL traffic towards different PDU session anchors and merge downlink (DL) traffic from different PDU session anchors associated with the link towards the UE 105. Such forwarding and/or merging may be based on traffic detection and traffic forwarding rules that may be provided by the SMF 330.

The UL CL 305 may apply one or more filter rules and determine how the packet(s) should be routed. For example, the rules may be associated with examining a destination IP address of one or more UL packets that are sent by the UE 105. The insertion and/or removal of aa UL CL may be determined and controlled by the SMF 330. The insertion and/removal of the UL CL may support corresponding traffic measurement for charging, traffic replication for lawful intercept (LI), and/or bit rate enforcement.

Figure 4:
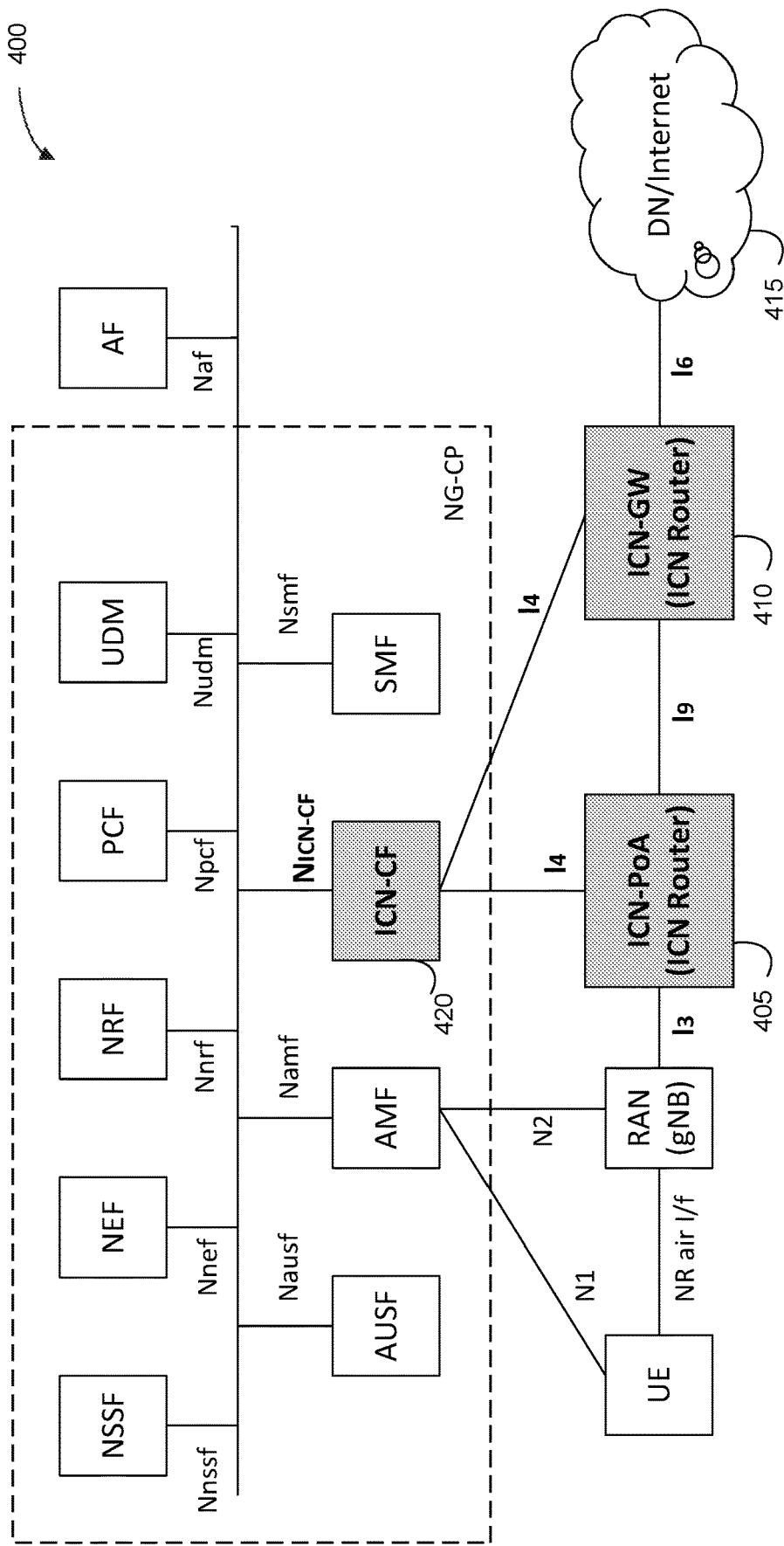
FIG. 4 illustrates an example 5G architecture with information centric networking (ICN), in accordance with various embodiments.

In embodiments, such more than one branch, PDU session anchor 1 310 and PDU session anchor 2 315 may reduce latency for the UE 105 while requesting data through a PDU session because one branch may be used to enable edge computing. For example, the PDU session anchor 2 315 may be associated with one or more edge nodes in a multi-access edge computing (MEC) network. Note that a UL CL may be referred to as a branching point. The terms "UL CL" and "branching point" are used interchangeably throughout this disclosure. FIG. 4 illustrates an example 5G architecture with ICN 400, in accordance with various embodiments. The ICN 400 may operate in a pull-based model and use two types of packets, which are interest packet and data packet. The ICN 400 may be based on a data structure that includes a pending interest table (PIT), forward information base (FIB), and content store (CS). The ICN 400 may use interest forward strategies that may take inputs from both the FIB and corresponding measurements to determine interest forwarding. When an AN in the network receives an ICN interest packet, the AN may check whether it already has the desired content cached according to its CS. If the desired content has been cached, the AN may direct corresponding route to fetch the cached content. Otherwise, the interest packet may be passed to the PIT so that a matching name may be found. If there is no match can be found, the AN may record the interest in its PIT and forward the interest packet to a next hop or hops towards the desired content based on the information in its FIB.

In a conventional ICN, a requestor, which may be a consumer or client, may send out an interest packet with a prefix that indicates one or more names of the desired content. Thus, each of the forwarding ANs may check the prefix of the interest packet and reply with corresponding data packet that matches the prefix. If there is no match found, the forwarding AN may forward the interest packet to or the interest to one or more other ANs in the network, based on its FIB table. The interest packet may be received by a source, for example, a producer or a server that is associated with the desired content. Then, the desired content may be acquired from the source. In embodiments, multi-homing and/or multicast may be enabled if there are more than one AN that can act as a source or there are more than one consumer requesting the same content. In contrast with an end-to-end session, an ICN request/response mechanism may be session-less and anchor-less, which leverages arbitrary available caching and incorporates content related routing. The ICN may enable a session-less protocol, with which a user may request certain content (e.g., chuck of data) to the network and the data may be retrieved from wherever the content may be stored or cached in the network. Further, functionalities that are implemented in the application layer, such as edge computing and/or caching, may be supported by the ICN in the network layer (L3).

However, conventional ICN in a 5G architecture may still be based on tunnel protocol and corresponding routing may follow a pre-defined route to a session anchor. This may limit utilization of caching and reusing the cached content. Further, this may not leverage ICN cached contents in a PDU session.

Various embodiments herein disclose cached data retrieval from ICN stack for a PDU session to leverage benefits of ICN so as to reduce latency of the PDU session. Corresponding interfaces and message exchanges are to be described as follows.

In embodiments, an ICN-point of attachment (ICN-PoA) 405 may serve as a first ICN-aware user plane entity for the UE 105 while running one or more ICN-enabled applications. A ICN-gateway (ICN-GW) 410 may be a user plane entity that is coupled with the ICN-PoA 405 and interfaces with a data network (DN) 415. Note that the DN 415 may support ICN-based schemes. In some embodiments, the ICN-GW 410 and a user plane function (UPF) PDU session anchor (PSA) may be of or in the same entity. Thus, an ICN-UPF entity may be instantiated and the functionalities of the ICN-GW 410 may be part of the UPF PSA. An ICN-control function (ICN-CF) 420 may handle ICN-related information and/or policies, and generate ICN transaction history among other ICN-related functionalities. These entities may be functional entities and may be incorporated into existing control network (CN) entities, which may enable flexible implementations. The newly introduced functions that enable the ICN in the 5G network architecture are highlighted in gray and bolded.

Figure 5:
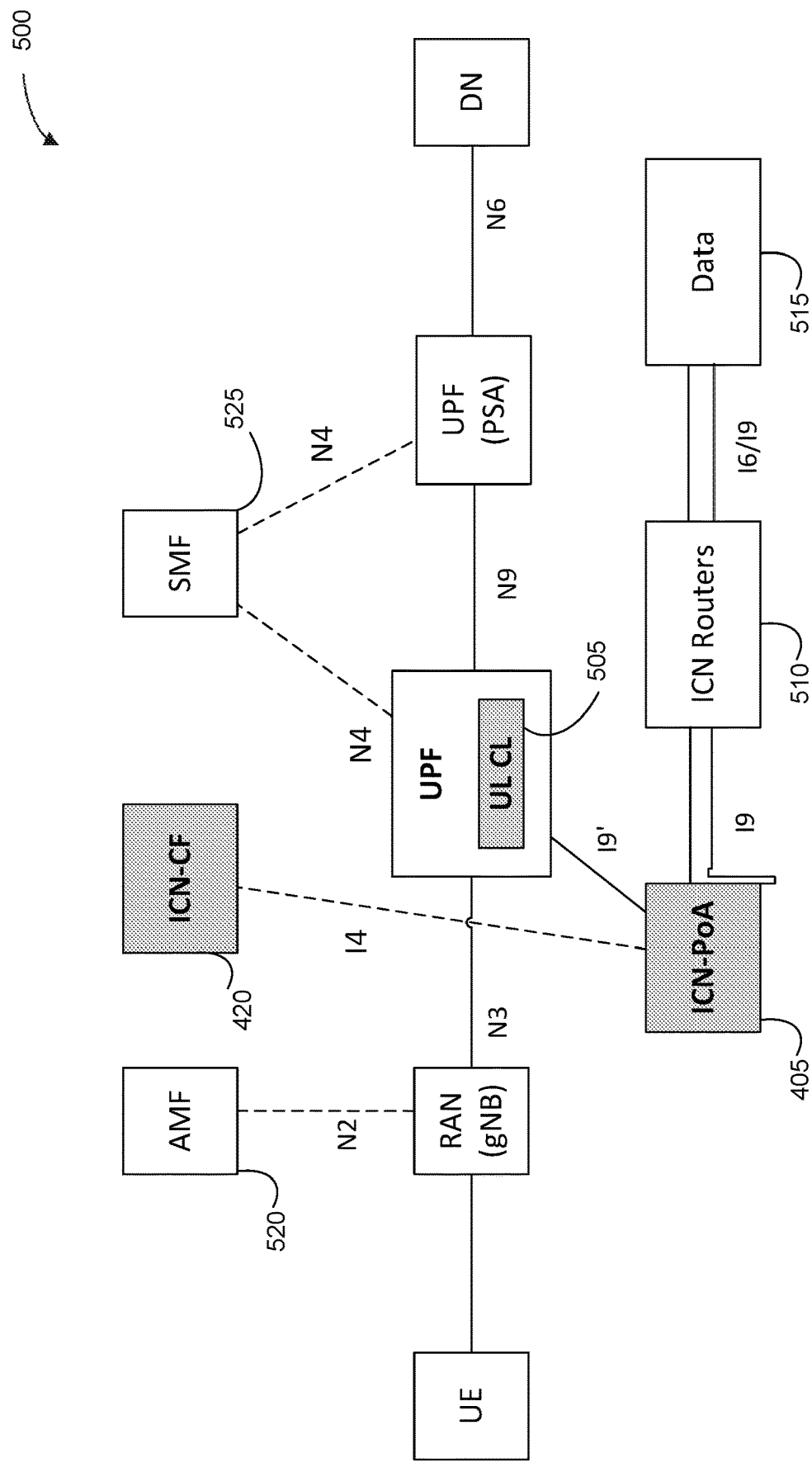
FIG. 5 illustrates an enhanced example architecture for UL CL supporting cached ICN data retrieval for a PDU session, in accordance with various embodiments.

FIG. 5 illustrates an enhanced example architecture 500 for UL CL supporting cached ICN data retrieval for a PDU session, in accordance with various embodiments. In a network based on the architecture 500, a 5G PDU session may request data that has been cached via the ICN in the network. The cached data may be retrieved and reused for a PDU session based on the architecture with ICN 400. An enhanced branching point, also known as UL CL 505, is illustrated in FIG. 5. The UL CL 505 may serve as a function to merge traffics from the PDU session and the ICN-PoA 405. The interfaces respectively between the ICN-CF 420, AMF, and SMF are the same as or substantially similar to the corresponding interfaces shown in FIG. 4. Note that the terms of "branching point" and "UL CL" are used interchangeably throughout this disclosure.

In embodiments, a new reference point between the ICN-PoA 405 and the UL CL 505 may be identified as $I_9'$. The protocols over or around $I_9'$ may be based on ICN, IP, and/or a tunnel protocol. If the ICN-PoA is collocated with a UPF, the $I_9'$ may be implemented over $N_9$. IF the $I_9'$ is based on ICN, a new functionality may be required to parsing ICN packets, ensure security, and/or merge a PDU session traffic. The communications between the ICN-PoA 405 and ICN routers 510, the ICN routers 510 and data 515 may be with respect to data plane.

In embodiments, a decision may be made to retrieve some or all of the requested content via ICN, during an establishment of a PDU session for the UE 105 or a stage of UE exchanging data with corresponding one or more application servers. In accordance, corresponding ICN-CF 420 and ICN-PoA 405 may be assigned to serve the UE 105.

Figure 6:
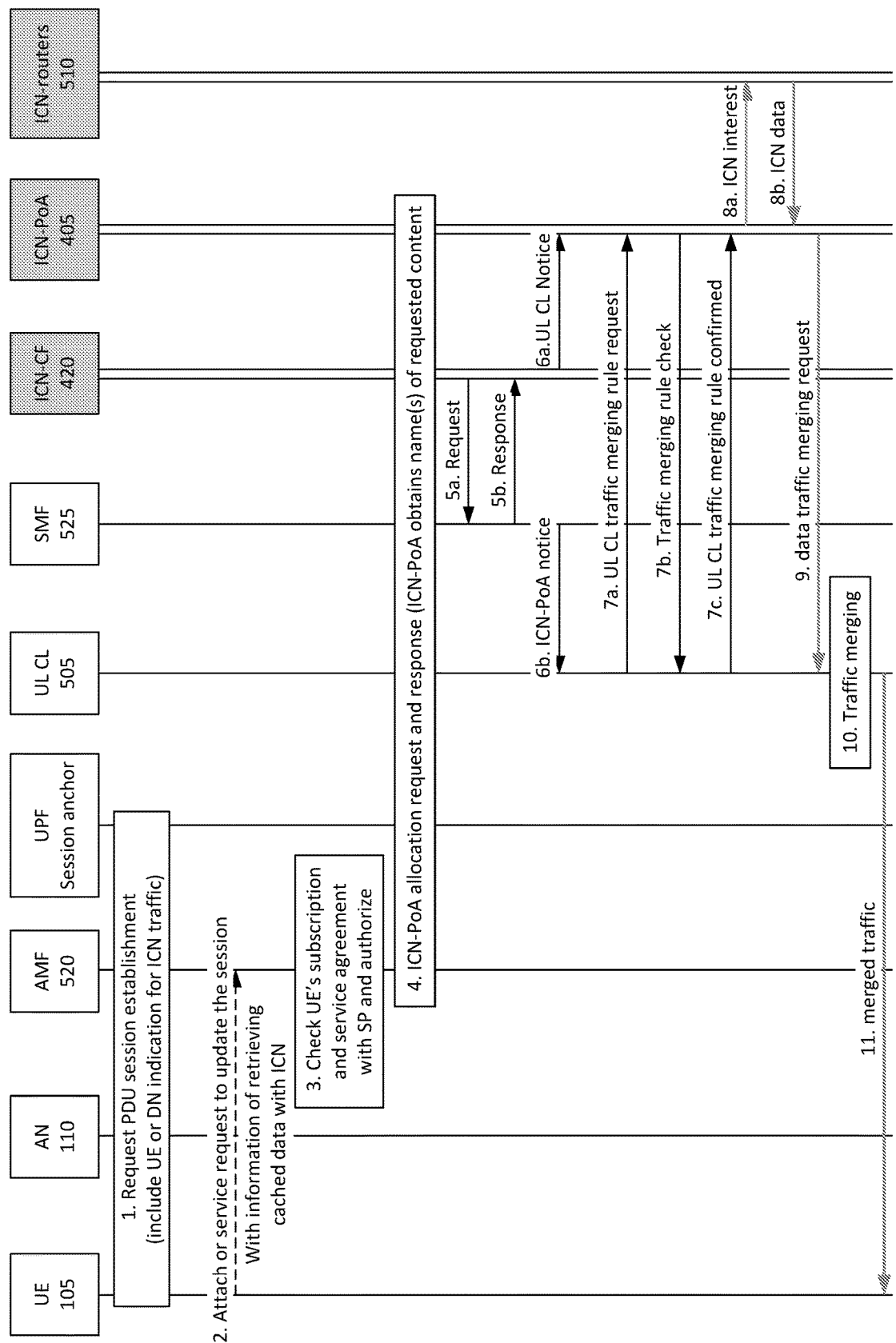
FIG. 6 illustrates example procedures of ICN data retrieval for PDU sessions, in accordance with various embodiments.

FIG. 6 illustrates example procedures of ICN data retrieval for PDU sessions, in accordance with various embodiments. Note that there may be two approaches to the ICN data retrieval. If there is an existing PDU session, an application may determine to retrieve data from the ICN via the application level traffic with the application server and acquire corresponding naming information. In this approach, the application server may have certain knowledge with regard to whether certain requested content has been cached in the cellular network according to associated traffic history. In a second approach, while establishing a new PDU session, retrieving data from ICN may be determined as a default selection. This approach may be useful when some static information is retrieved via the ICN, e.g., a playlist of an application server. Note that the vertical lines connected with respective functionalities are either single-lines or double-lines. The single-lines indicate that corresponding communications and/or traffics are via a control plane, and the double-lines indicate that corresponding communications and/or traffics are via a data plane.

At operation 1, the UE 105 may request to establish a PDU session and exchange corresponding information with the associated application server, which is not shown in FIG. 6. During this procedure, the application server may instruct the UE's application to retrieve data via the ICN by application level traffic. Or the UE 105 may indicate to retrieve the cached data via the ICN. The application server may be located in the DN. Further details in these regards may be discussed in 3GPP technical specification (TS) 23.502, Section 4.3.2.2 (TS 23.502 v15.3.0, 2018-9).

At operation 2, if the application server instructs the UE 105 to retrieve content/data via the ICN, the UE 105 may send a Non-Access Stratum (NAS) message to indicate the retrieval of ICN cached data. Such an NAS message may be an attach request or a service request. This option is conditional upon whether the application instructs the UE 105 to retrieve ICN data. The NAS message may further include an indicator for ICN, requested content name, etc.

In embodiments, if the UE 105 is agnostic of the ICN data retrieval, the UE 105 may send a normal NAS without additional information regarding the ICN data retrieval. Then, the AMF 520 may determine the information regarding the ICN data retrieval based on the subscription and/or agreement of the UE 105 with respect to the service provider. Corresponding communications with a policy control function (PCF) (not shown) and/or the SMF 525 may be used for such a determination by the AMF 520.

At operation 3, the AMF 520 may receive the NAS message in accordance with the operation 2. The AMF 520 may check corresponding UE's subscription and/or agreement with associated service provider (SP). The AMF 520 may authorize the request to retrieve data with the ICN.

At operation 4, the AMF 520 may request the ICN-CF 420 to serve the UE 105. The ICN-CF 420 may assign the ICN-PoA 405 to serve the UE 105. During this operation, the ICN-PoA 405 may obtain one or more names associated with the requested content. Such information may come from the NAS message, and be transferred to the ICN-PoA 405 via the ICN-CF 420.

At operation 5a, the ICN-CF 420 may send a request to the SMF 525 for adding a UL CL 505 for ICN. The request may include information of the requested UL CL capabilities and preferences, such as location(s), traffic type(s), etc. This operation may be similar to the procedure of addition of additional UL CL described in Section 4.3.5.4 of TS 23.502.

At operation 5b, the SMF 525, upon reception of the request sent by the ICN-CF 420, may generate and transmit a reply to the request. The reply may include an assigned UL CL identity. Otherwise, the SMF 525 may reject the request sent by the ICN-CF 420.

At operation 6a, the ICN-CF 420 may notify the ICN-PoA 405 of the assigned UL CL information for merging traffic. The assigned UL CL 505 may be used to merge traffics from different PDU session anchors.

At operation 6b, the SMF 525 may notify the UL CL 505 of the information of the ICN-PoA 405 for merging traffic.

At operation 7a, the UL CL 505 may generate one or more traffic merging rules for this particularly requested traffic merging. The rules may be selected by the UL CL 505 based on a plurality of traffic merging rules. The UL CL 505 may transmit a traffic merging rule request that includes the selected or determined rules by the UL CL 505, to the ICN-PoA 405.

At operation 7b, the ICN-PoA 405, upon reception of the traffic merging rule request, may select one or more options for traffic merging based on the traffic merging rule request. the ICN-PoA 405 may generate and transmit a traffic merging rule check to the UL CL 505 in response to the traffic merging rule request.

At operation 7c, the UL CL 505, upon reception of the traffic merging rule check, may confirm the selected one or more traffic merging rules. The UL CL 505 may transmit such a confirmation to the ICN-PoA 405 via a rule confirm message.

At operation 8a, the ICN-PoA 405 may send an ICN interest request to the one or more ICN-routers 510. The interest request may be based on the naming information obtained at operations 1 and/or 2.

At operation 8b, the ICN-PoA 405 may receive corresponding data packet(s) form the ICN-routers 510. The one or more ICN-routers 510, upon reception of the ICN interest packet, may retrieve and transmit the cached ICN data.

At operation 9, the ICN-PoA 405 may receive the data packet(s) from the ICN-routers 510. The ICN-PoA 405 may transmit the received data packet(s) to the UL CL 505 for traffic merging.

At operation 10, the UL CL 505 may merge the traffic by inserting the packet(s) received from the ICN-routers 510 to corresponding PDU session. The UL CL 505 may convert the received ICN data packet(s) into IP packet(s) prior to inserting the packet(s) into the PDU session.

At operation 11, the UL CL 505 may transmit the merged traffic or data to the UE 105.

Figure 7:
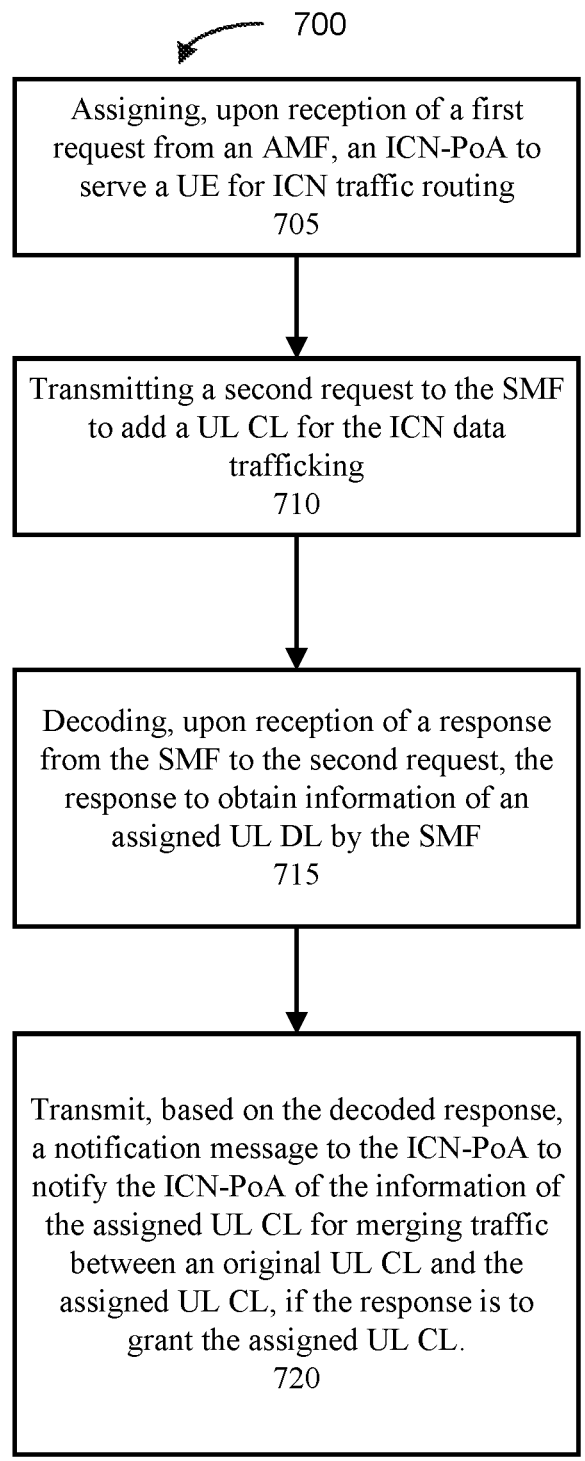
FIG. 7 illustrates an operation flow/algorithmic structure from an ICN-control function (ICN-CF) perspective, in accordance with some embodiments.

FIG. 7 illustrates an operation flow/algorithmic structure 700 in accordance with some embodiments. The operation flow/algorithmic structure 700 may be part of ICN cached data retrieval that is enabled by the ICN-CF 420, with respect to FIG. 6.

At 705, the operation flow/algorithmic structure 700 may include assigning, upon reception of a first request from an AMF, an ICN-PoA to serve a UE for ICN traffic routing. The AMF and the ICN-PoA may be the same as or substantially similar to the AMF 520 and the ICN-PoA 405, which are described in FIGS. 4-6.

In some embodiments, the AMF may not send a direct request to the ICN-CF. Rather, the AMF may send corresponding ICN data information to the ICN-CF and allow ICN-CF to handle ICN related activities. In some other embodiments, an ICN-PoA assignment may be triggered by an NAS message, which is further discussed in operation 2 with respect to FIG. 6. The AMF may forward corresponding information to the ICN-CF. At 710, the operation flow/algorithmic structure 700 may include transmitting a second request to the SMF to add a UL CL for the ICN data trafficking. The UL CL may be the same as or substantially similar to the UL CL 505, which is described in FIGS. 5-6.

At 715, the operation flow/algorithmic structure 700 may include decoding, upon reception of a response from the SMF to the second request, the response to obtain information of an assigned UL CL by the SMF.

At 720, the operation flow/algorithmic structure 700 may include transmitting, based on the decoded response, a notification message to the ICN-PoA to notify the ICN-PoA of the information of the assigned UL CL for merging traffic between a PDU session anchor and the ICN-PoA, if the response is to grant the assigned UL CL.

In embodiments, the ICN data may be cached in one or more edge nodes in a multi-access edge computing (MEC) network.

Figure 8:
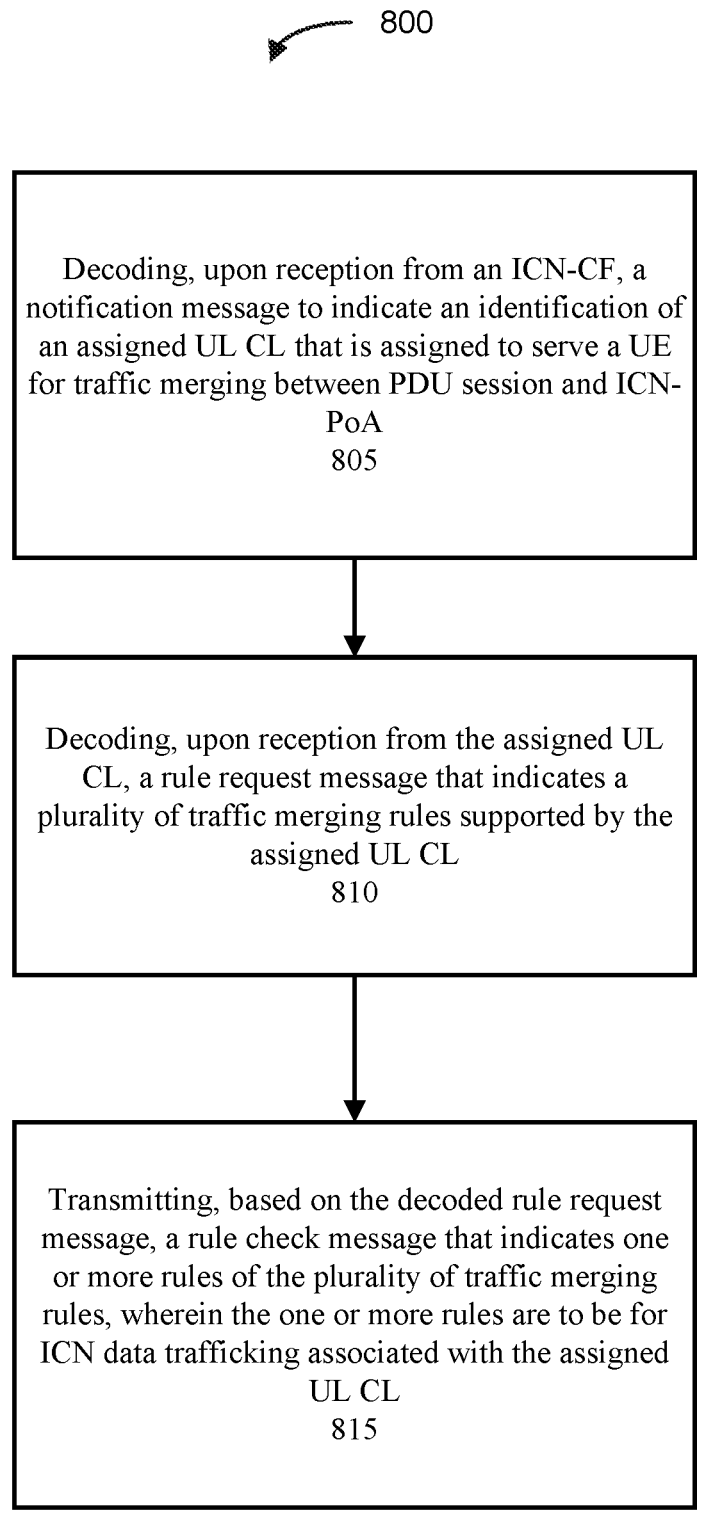
FIG. 8 illustrates the operation flow/algorithmic structure from an ICN-point of attachment (ICN-PoA) perspective, in accordance with some embodiments.

FIG. 8 illustrates an operation flow/algorithmic structure 800 in accordance with some embodiments. The operation flow/algorithmic structure 800 may be part of ICN cached data retrieval that is enabled by the ICN-PoA 405, with respect to FIG. 6.

At 805, the operation flow/algorithmic structure 800 may include decoding, upon reception from an ICN-CF, a notification message to indicate an identification of an assigned UL CL that is assigned to serve a UE for traffic merging between the PDU session anchor and the ICN-PoA. The ICN-CF may be the same as or substantially similar to the ICN-CF 420, which are described in FIGS. 4-6.

At 810, the operation flow/algorithmic structure 800 may include decoding, upon reception from the assigned UL CL, a rule request message that indicates a plurality of traffic merging rules supported by the assigned UL CL.

At 815, the operation flow/algorithmic structure 800 may include transmitting, based on the decoded rule request message, a rule check message that indicates one or more rules of the plurality of traffic merging rules, wherein the one or more rules are to be for ICN data trafficking associated with the assigned UL CL.

In some embodiments, the operation flow/algorithmic structure 800 may further include receiving, from the ICN-CF, an assignment to serve a UE for ICN traffic routing. The operation flow/algorithmic structure 800 may further include determining the one or more rules of the plurality of traffic merging rules, based on the decoded rule request message.

In some embodiments, the operation flow/algorithmic structure 800 may further include decoding, upon reception from the assigned UL CL, a merging rule confirmation message that confirms the one or more rules of the plurality of traffic merging rules. The operation flow/algorithmic structure 800 may further include transmitting an ICN interest request to one or more ICN routers to retrieve cached ICN data, based on naming information associated with the cached ICN data.

Figure 9:
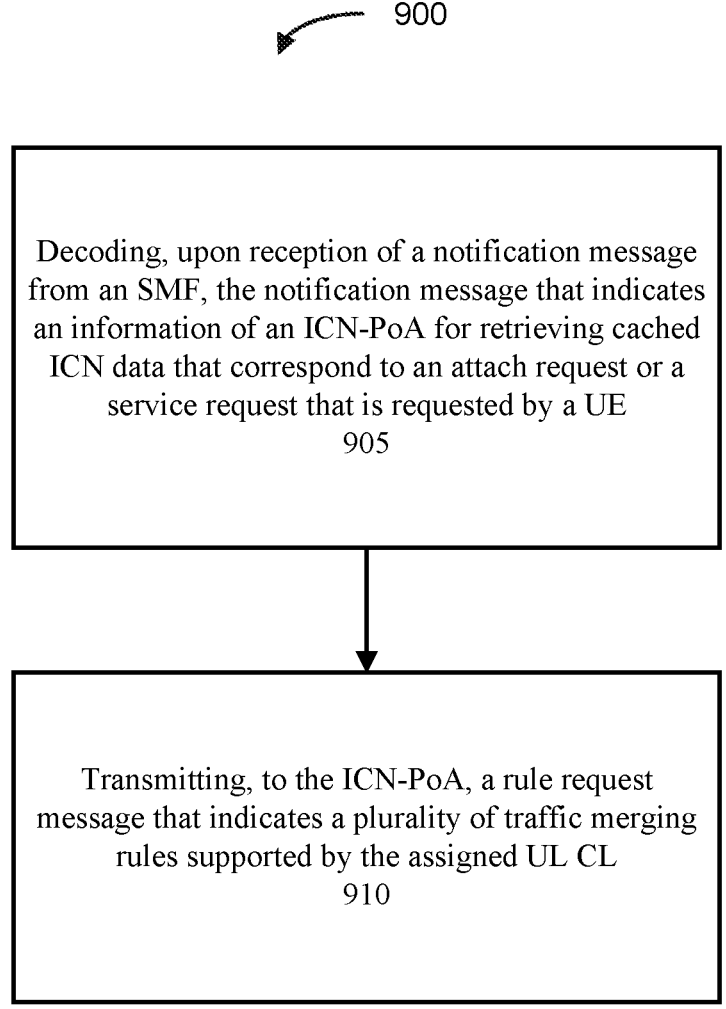
FIG. 9 illustrates the operation flow/algorithmic structure from an uplink classifier (UL CL) perspective, in accordance with some embodiments.

FIG. 9 illustrates an operation flow/algorithmic structure 900 in accordance with some embodiments. The operation flow/algorithmic structure 900 may be part of ICN cached data retrieval that is enabled by an assigned UL CL. The assigned UL CL is the same or substantially similar to the UL CL 505, with respect to FIG. 6.

At 905, the operation flow/algorithmic structure 900 may include decoding, upon reception of a notification message from an SMF, the notification message that indicates an information of an ICN-PoA for retrieving cached ICN data that correspond to an attach request or a service request that is requested by a UE.

At 910, the operation flow/algorithmic structure 900 may include transmitting, to the ICN-PoA, a rule request message that indicates a plurality of traffic merging rules supported by the assigned UL CL.

In some embodiments, the operation flow/algorithmic structure 900 may further include decoding, upon reception from the ICN-PoA, a rule check message that indicates one or more rules of the plurality of traffic merging rules, wherein the one or more rules are to be for ICN data trafficking associated with the assigned UL CL and are selected by the ICN-PoA. The operation flow/algorithmic structure 900 may further include transmitting, to the ICN-PoA, a merging rule confirmation message that confirms the one or more rules of the plurality of traffic merging rules.

Figure 10:
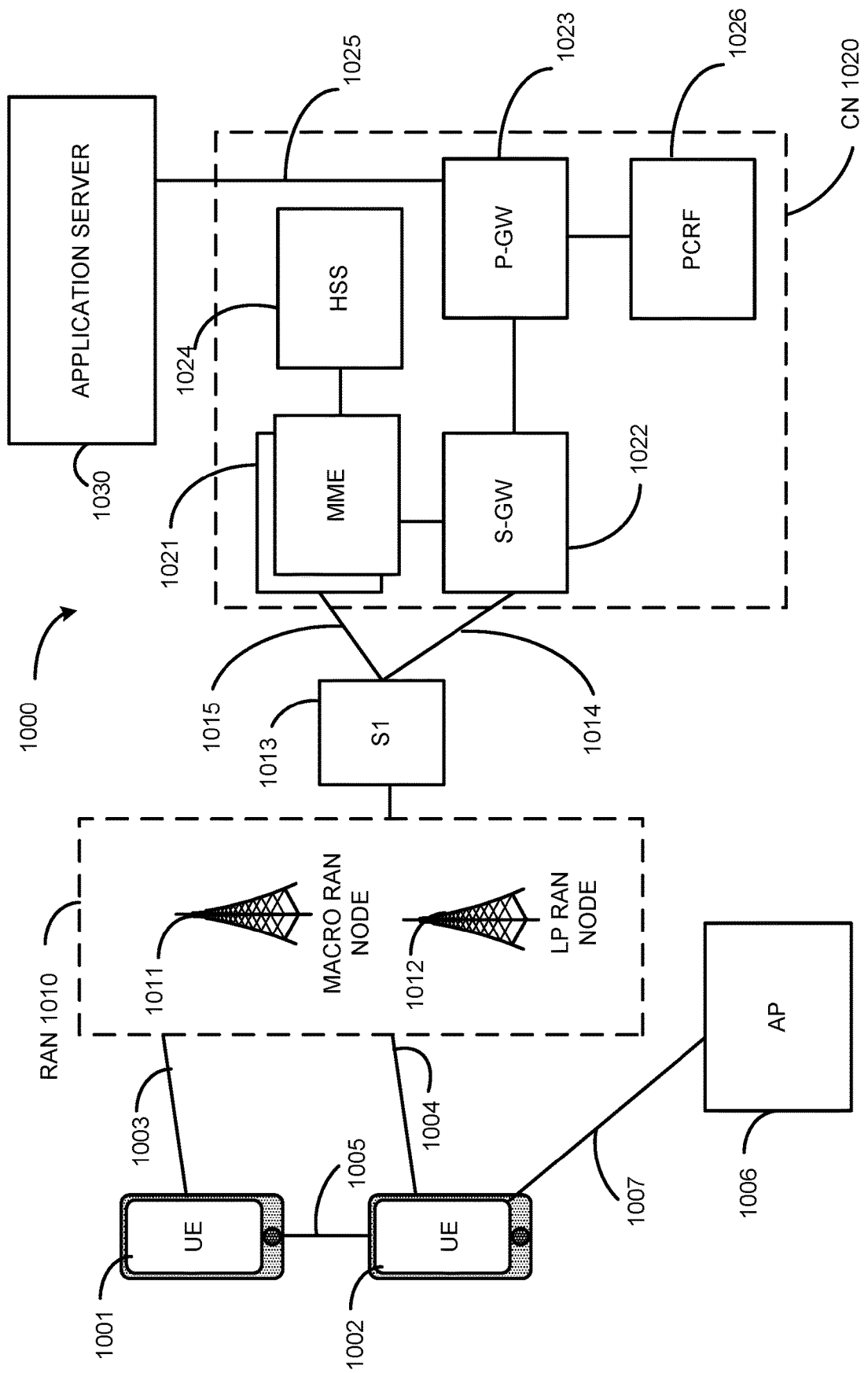
FIG. 10 illustrates an architecture of a system of a network in accordance with some embodiments.

FIG. 10 illustrates an architecture of a system 1000 of a network in accordance with some embodiments. The system 1000 is shown to include a user equipment (UE) 1001 and a UE 1002. As used herein, the term "user equipment" or "UE" may refer to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 1001 and 1002 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, and/or the like.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a radio access network (RAN) 1010. The RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections (or channels) 1003 and 1004, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 1005 may be used in vehicular applications and communications technologies, which are often referred to as V2X systems. V2X is a mode of communication where UEs (for example, UEs 1001, 1002) communicate with each other directly over the PC5/SL interface 1005 and can take place when the UEs 1001, 1002 are served by RAN nodes 1011, 1012 or when one or more UEs are outside a coverage area of the RAN 1010. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 1001, 1002, RAN nodes 1011, 1012, application servers 1030, and pedestrian UEs 1001, 1002 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 1001, 1002 may be implemented/employed as Vehicle Embedded Communications Systems (VECS) or vUEs.

The UE 1002 is shown to be configured to access an access point (AP) 1006 (also referred to as also referred to as "WLAN node 1006", "WLAN 1006", "WLAN Termination 1006", or "WT 1006" or the like) via connection 1007. The connection 1007 can comprise a local wireless connection, such as a connection consistent with any IEEE 802.11 protocol, wherein the AP 1006 would comprise a wireless fidelity (WiFi®) router. In this example, the AP 1006 is shown to be connected to the Internet without connecting to the core network of the wireless system (described in further detail below). In various embodiments, the UE 1002, RAN 1010, and AP 1006 may be configured to utilize LTE-WLAN aggregation (LWA) operation and/or WLAN LTE/WLAN Radio Level Integration with IPsec Tunnel (LWIP) operation. The LWA operation may involve the UE 1002 in RRC CONNECTED being configured by a RAN node 1011, 1012 to utilize radio resources of LTE and WLAN. LWIP operation may involve the UE 1002 using WLAN radio resources (e.g., connection 1007) via Internet Protocol Security (IPsec) protocol tunneling to authenticate and encrypt packets (e.g., internet protocol (IP) packets) sent over the connection 1007. IPsec tunneling may include encapsulating entirety of original IP packets and adding a new packet header, thereby protecting the original header of the IP packets.

The RAN 1010 can include one or more access nodes that enable the connections 1003 and 1004. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU" and an RSU implemented in or by an eNB may be referred to as an "eNB-type RSU." The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1001 and 1002. The physical downlink control channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 1002 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020 via an S1 interface 1013. In embodiments, the CN 1020 may be an evolved packet core (EPC) network, a NextGen Packet Core (NPC) network, or some other type of CN. In this embodiment the S1 interface 1013 is split into two parts: the S1-U interface 1014, which carries traffic data between the RAN nodes 1011 and 1012 and the serving gateway (S-GW) 1022, and the S1-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an S1 interface toward a PDN. The P-GW 1023 may route data packets between the S-GW 1022 and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

Figure 11:
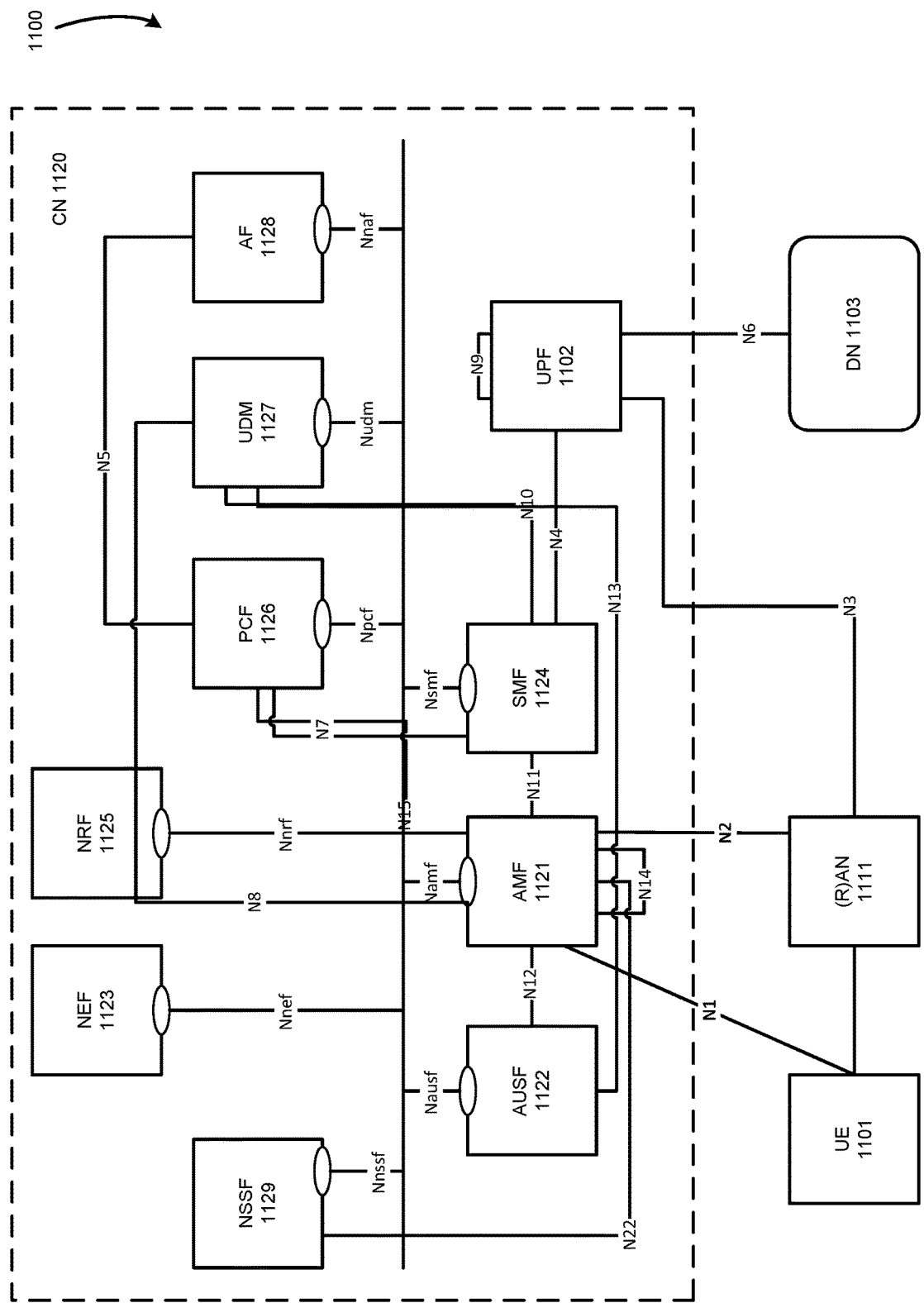
FIG. 11 illustrates another architecture of a system of a network in accordance with some embodiments.

FIG. 11 illustrates an architecture of a system 1100 of a network in accordance with some embodiments. The system 1100 is shown to include a UE 1101, which may be the same or similar to UEs 1001 and 1202 discussed previously; a RAN node 1111, which may be the same or similar to RAN nodes 1011 and 1212 discussed previously; a data network (DN) 1103, which may be, for example, operator services, Internet access or 3rd party services; and a 5G Core Network (5GC or CN) 1120.

The CN 1120 may include an Authentication Server Function (AUSF) 1122; an Access and Mobility Management Function (AMF) 1121; a Session Management Function (SMF) 1124; a Network Exposure Function (NEF) 1123; a Policy Control Function (PCF) 1126; a Network Function (NF) Repository Function (NRF) 1125; a Unified Data Management (UDM) 1127; an Application Function (AF) 1128; a User Plane Function (UPF) 1102; and a Network Slice Selection Function (NSSF) 1129.

The UPF 1102 may act as an anchor point for intra-RAT and inter-RAT mobility, an external PDU session point of interconnect to DN 1103, and a branching point to support multi-homed PDU session. The UPF 1102 may also perform packet routing and forwarding, performer packet inspection, enforce user plane part of policy rules, lawfully intercept packets (UP collection); perform traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 1102 may include an uplink classifier to support routing traffic flows to a data network. The DN 1103 may represent various network operator services, Internet access, or third party services. DN 1103 may include, or be similar to, application server 630 discussed previously. The UPF 1102 may interact with the SMF 1124 via an N4 reference point between the SMF 1124 and the UPF 1102.

The AUSF 1122 may store data for authentication of UE 1101 and handle authentication related functionality. The AUSF 1122 may facilitate a common authentication framework for various access types. The AUSF 1122 may communicate with the AMF 1121 via an N12 reference point between the AMF 1121 and the AUSF 1122; and may communicate with the UDM 1127 via an N13 reference point between the UDM 1127 and the AUSF 1122. Additionally, the AUSF 1122 may exhibit an Nausf service-based interface.

The AMF 1121 may be responsible for registration management (e.g., for registering UE 1101, etc.), connection management, reachability management, mobility management, and lawful interception of AMF-related events, and access authentication and authorization. The AMF 1121 may be a termination point for an N11 reference point between the AMF 1121 and the SMF 1124. The AMF 1121 may provide transport for Session Management (SM) messages between the UE 1101 and the SMF 1124, and act as a transparent proxy for routing SM messages. AMF 1121 may also provide transport for short message service (SMS) messages between UE 1101 and an SMS function (SMSF) (not shown by FIG. 7). AMF 1121 may act as Security Anchor Function (SEA), which may include interaction with the AUSF 1122 and the UE 1101, receipt of an intermediate key that was established as a result of the UE 1101 authentication process. Where USIM based authentication is used, the AMF 1121 may retrieve the security material from the AUSF 1122. AMF 1121 may also include a Security Context Management (SCM) function, which receives a key from the SEA that it uses to derive access-network specific keys. Furthermore, AMF 1121 may be a termination point of RAN CP interface, which may include or be an N2 reference point between the (R)AN 1111 and the AMF 1121; and the AMF 1121 may be a termination point of NAS (N1) signalling, and perform NAS ciphering and integrity protection.

AMF 1121 may also support NAS signaling with a UE 1101 over an N3 interworking-function (IWF) interface. The N3IWF may be used to provide access to untrusted entities. N3IWF may be a termination point for the N2 interface between the (R)AN 1111 and the AMF 1121 for the control plane, and may be a termination point for the N3 reference point between the (R)AN 1111 and the UPF 1102 for the user plane. As such, the AMF 1121 may handle N2 signalling from the SMF 1124 and the AMF 1121 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 1101 and AMF 1121 via an N1 reference point between the UE 1101 and the AMF 1121, and relay uplink and downlink user-plane packets between the UE 1101 and UPF 1102. The N3IWF also provides mechanisms for IPsec tunnel establishment with the UE 1101. The AMF 1121 may exhibit an Namf service-based interface, and may be a termination point for an N14 reference point between two AMFs 1121 and an N17 reference point between the AMF 1121 and a 5G-Equipment Identity Register (5G-EIR) (not shown by FIG. 11).

The SMF 1124 may be responsible for session management (e.g., session establishment, modify and release, including tunnel maintain between UPF and AN node); UE IP address allocation and management (including optional authorization); selection and control of UP function; configuring traffic steering at UPF to route traffic to proper destination; termination of interfaces towards policy control functions; controlling part of policy enforcement and QoS; lawful intercept (for SM events and interface to LI system); termination of SM parts of NAS messages; downlink Data Notification; initiation of AN specific SM information, sent via AMF 1121 over N2 to (R)AN 1111; and determining SSC mode of a session. The SMF 1124 may include the following roaming functionality: handle local enforcement to apply QoS SLAB (VPLMN); charging data collection and charging interface (VPLMN); lawful intercept (in VPLMN for SM events and interface to LI system); support for interaction with external DN for transport of signalling for PDU session authorization/authentication by external DN. An N16 reference point between two SMFs 1124 may be included in the system 1100, which may be between another SMF 1124 in a visited network and the SMF 1124 in the home network in roaming scenarios. Additionally, the SMF 1124 may exhibit the Nsmf service-based interface. The NEF 1123 may provide means for securely exposing the services and capabilities provided by 3GPP network functions for third party, internal exposure/re-exposure, Application Functions (e.g., AF 1128), edge computing or fog computing systems, etc. In such embodiments, the NEF 1123 may authenticate, authorize, and/or throttle the AFs. NEF 1123 may also translate information exchanged with the AF 1128 and information exchanged with internal network functions. For example, the NEF 1123 may translate between an AF-Service-Identifier and an internal 5GC information. NEF 1123 may also receive information from other network functions (NFs) based on exposed capabilities of other network functions. This information may be stored at the NEF 1123 as structured data, or at a data storage NF using standardized interfaces. The stored information can then be re-exposed by the NEF 1123 to other NFs and AFs, and/or used for other purposes such as analytics. Additionally, the NEF 1123 may exhibit an Nnef service-based interface.

The NRF 1125 may support service discovery functions, receive NF Discovery Requests from NF instances, and provide the information of the discovered NF instances to the NF instances. NRF 1125 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 1125 may exhibit the Nnrf service-based interface.

The PCF 1126 may provide policy rules to control plane function(s) to enforce them, and may also support unified policy framework to govern network behavior. The PCF 1126 may also implement a front end (FE) to access subscription information relevant for policy decisions in a UDR of the UDM 1127. The PCF 1126 may communicate with the AMF 1121 via an N15 reference point between the PCF 1126 and the AMF 1121, which may include a PCF 1126 in a visited network and the AMF 1121 in case of roaming scenarios. The PCF 1126 may communicate with the AF 1128 via an N5 reference point between the PCF 1126 and the AF 1128; and with the SMF 1124 via an N7 reference point between the PCF 1126 and the SMF 1124. The system 1100 and/or CN 1120 may also include an N24 reference point between the PCF 1126 (in the home network) and a PCF 1126 in a visited network. Additionally, the PCF 1126 may exhibit an Npcf service-based interface.

The UDM 1127 may handle subscription-related information to support the network entities' handling of communication sessions, and may store subscription data of UE 1101. For example, subscription data may be communicated between the UDM 1127 and the AMF 1121 via an N8 reference point between the UDM 1127 and the AMF 1121. The UDM 1127 may include two parts, an application FE and a User Data Repository (UDR) (the FE and UDR are not shown by FIG. 11). The UDR may store subscription data and policy data for the UDM 1127 and the PCF 1126, and/or structured data for exposure and application data (including Packet Flow Descriptions (PFDs) for application detection, application request information for multiple UEs 1101) for the NEF 1123. The Nudr service-based interface may be exhibited by the UDR to allow the UDM 1127, PCF 1126, and NEF 1123 to access a particular set of the stored data, as well as to read, update (e.g., add, modify), delete, and subscribe to notification of relevant data changes in the UDR. The UDM may include a UDM FE, which is in charge of processing of credentials, location management, subscription management, and so on. Several different front ends may serve the same user in different transactions. The UDM-FE accesses subscription information stored in the UDR and performs authentication credential processing; user identifier handling; access authorization; registration/mobility management; and subscription management. The UDR may interact with the SMF 1124 via an N10 reference point between the UDM 1127 and the SMF 1124. UDM 1127 may also support SMS management, wherein an SMS-FE implements the similar application logic as discussed previously. Additionally, the UDM 1127 may exhibit the Nudm service-based interface.

The AF 1128 may provide application influence on traffic routing, provide access to the Network Capability Exposure (NCE), and interact with the policy framework for policy control. The NCE may be a mechanism that allows the 5GC and AF 1128 to provide information to each other via NEF 1123, which may be used for edge computing implementations. In such implementations, the network operator and third party services may be hosted close to the UE 1101 access point of attachment to achieve an efficient service delivery through the reduced end-to-end latency and load on the transport network. For edge computing implementations, the 5GC may select a UPF 1102 close to the UE 1101 and execute traffic steering from the UPF 1102 to DN 1103 via the N6 interface. This may be based on the UE subscription data, UE location, and information provided by the AF 1128. In this way, the AF 1128 may influence UPF (re)selection and traffic routing. Based on operator deployment, when AF 1128 is considered to be a trusted entity, the network operator may permit AF 1128 to interact directly with relevant NFs. Additionally, the AF 1128 may exhibit an Naf service-based interface.

The NSSF 1129 may select a set of network slice instances serving the UE 1101. The NSSF 1129 may also determine allowed Network Slice Selection Assistance Information (NSSAI) and the mapping to the Subscribed Single-NSSAIs (S-NSSAIs), if needed. The NSSF 1129 may also determine the AMF set to be used to serve the UE 1101, or a list of candidate AMF(s) 1121 based on a suitable configuration and possibly by querying the NRF 1125. The selection of a set of network slice instances for the UE 1101 may be triggered by the AMF 1121 with which the UE 1101 is registered by interacting with the NSSF 1129, which may lead to a change of AMF 1121. The NSSF 1129 may interact with the AMF 1121 via an N22 reference point between AMF 1121 and NSSF 1129; and may communicate with another NSSF 1129 in a visited network via an N31 reference point (not shown by FIG. 11). Additionally, the NSSF 1129 may exhibit an Nnssf service-based interface.

As discussed previously, the CN 1120 may include an SMSF, which may be responsible for SMS subscription checking and verification, and relaying SM messages to/from the UE 1101 to/from other entities, such as an SMS-GMSC/IWMSC/SMS-router. The SMS may also interact with AMF 1121 and UDM 1127 for notification procedure that the UE 1101 is available for SMS transfer (e.g., set a UE not reachable flag, and notifying UDM 1127 when UE 1101 is available for SMS).

The CN 1120 may also include other elements that are not shown by FIG. 11, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 11). Individual NFs may share a UDSF for storing their respective unstructured data or individual NFs may each have their own UDSF located at or near the individual NFs. Additionally, the UDSF may exhibit an Nudsf service-based interface (not shown by FIG. 11). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 11 for clarity. In one example, the CN 1120 may include an Nx interface, which is an inter-CN interface between the MME (e.g., MME 1021) and the AMF 1121 in order to enable interworking between CN 1120 and CN 1220. Other example interfaces/reference points may include an N5g-eir service-based interface exhibited by a 5G-EIR, an N27 reference point between NRF in the visited network and the NRF in the home network, and an N31 reference point between the NSSF in the visited network and the NSSF in the home network.

In yet another example, system 1100 may include multiple RAN nodes 1111 wherein an Xn interface is defined between two or more RAN nodes 1111 (e.g., gNBs and the like) that connect to 5GC, between a RAN node 1111 (e.g., gNB) connecting to 5GC 1120 and an eNB (e.g., a RAN node 1011 of FIG. 10), and/or between two eNBs connecting to 5GC 1120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1101 in a connected mode (e.g., CM-CONNECTED) including functionality to manage the UE mobility for connected mode between one or more RAN nodes 1111. The mobility support may include context transfer from an old (source) serving RAN node 1111 to new (target) serving RAN node 1111; and control of user plane tunnels between old (source) serving RAN node 1111 to new (target) serving RAN node 1111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same as or similar to the user plane and/or control plane protocol stack(s) shown and described herein.

Figure 12:
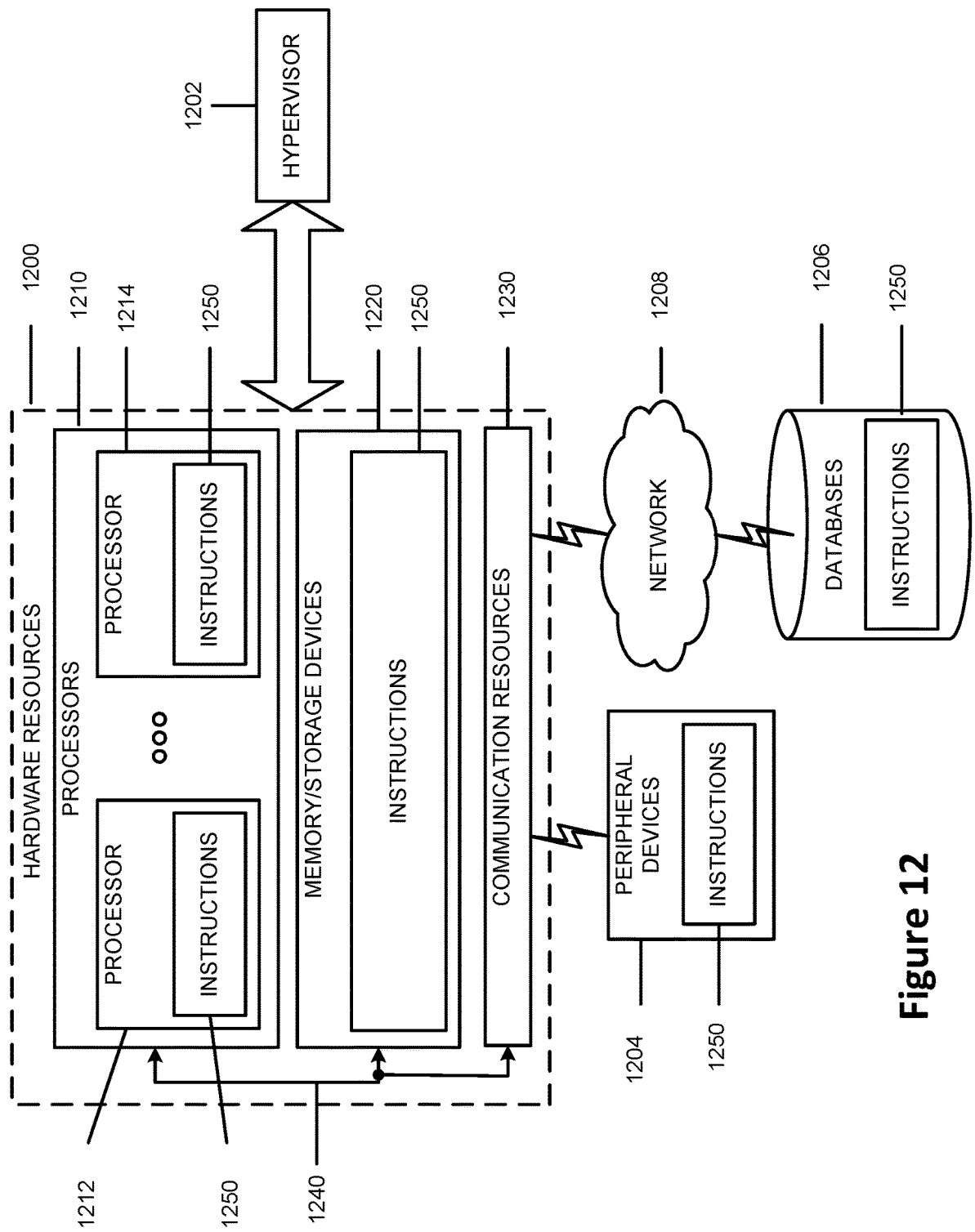
FIG. 12 is a block diagram illustrating components, according to some embodiments.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1202 may be executed to provide an execution environment for one or more network slices/sub-slices to utilize the hardware resources 1200. A "virtualized resource" may refer to compute, storage, and/or network resources provided by virtualization infrastructure to an application, device, system, etc.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects, or services, accessible through a server where such system resources reside on a single host or multiple hosts and are clearly identifiable.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

In some embodiments, the electronic device(s), network(s), system(s), chip(s) or component(s), or portions or implementations thereof, of figures herein may be configured to perform one or more processes, techniques, or methods as described herein, or portions thereof.

Some non-limiting Examples of various embodiments are provided below.

Example 1 may include a method comprising: assigning, upon reception of a first message from an access and mobility management function (AMF), an ICN-point of attachment (ICN-PoA) to serve a user equipment (UE) for ICN traffic routing; transmitting a request to a session management function (SMF) to assign an uplink classifier (UL CL) for the ICN data trafficking; decoding, upon reception of a response from the SMF to the request, the response to obtain information of an assigned UL CL by the SMF; and transmitting, based on the decoded response, a notification message to the ICN-PoA to notify the ICN-PoA of the information of the assigned UL CL for merging traffic between the ICN-PoA and a protocol data unit (PDU) session that is associated with the assigned UL CL, if the response is to grant the assigned UL CL.

Example 2 may include the method of example 1 and/or some other example herein, wherein the request to the SMF is a second request, and the first message includes a first request from the AMF, and wherein the first request is to request the ICN-CF to serve the UE for the ICN traffic routing.

Example 3 may include the method of example 2 and/or some other example herein, wherein the first message includes ICN data trafficking related information.

Example 4 may include the method of example 2 and/or some other example herein, wherein the first message includes an NAS message that indicate ICN data related trafficking.

Example 5 may include the method of example 2 and/or some other example herein, wherein the second request is to include information with respect to capabilities and preferences of the assigned UL CL, and the capabilities and preferences include ICN traffic types and locations.

Example 6 may include the method of example 1 and/or some other example herein, wherein the assigned UL CL is associated with the PDU session and is to handle ICN data that are cached in an ICN-based data network (DN).

Example 7 may include the method of example 6 and/or some other example herein, wherein the ICN data are to be cached in one or more edge nodes in a mobile edge computing (MEC) network.

Example 8 may include the method of any of examples 1-7 and/or some other example herein, wherein the information of the assigned UL CL includes an identification of the assigned UL CL.

Example 9 may include the method of any of examples 1-8 and/or some other example herein, wherein the method is performed by the ICN-CF or a portion thereof.

Example 10 may include a method, comprising: decoding, upon reception from an ICN control function (ICN-CF), a notification message to indicate an identification of an assigned uplink classifier (UL CL) that is assigned to serve a user equipment (UE) for traffic merging between a protocol data unit (PDU) session and the ICN-PoA; decoding, upon reception from the assigned UL CL, a rule request message that indicates a plurality of traffic merging rules supported by the assigned UL CL; and transmitting, based on the decoded rule request message, a rule check message that indicates one or more rules of the plurality of traffic merging rules, wherein the one or more rules are to be for ICN data trafficking associated with the assigned UL CL.

Example 11 may include the method of example 10 and/or some other example herein, further comprising receiving, from the ICN-control function (ICN-CF), an assignment to serve a user equipment (UE) for ICN traffic routing.

Example 12 may include the method of example 10 and/or some other example herein, further comprising determining the one or more rules of the plurality of traffic merging rules, based on the decoded rule request message.

Example 13 may include the method of example 10 and/or some other example herein, further comprising decoding, upon reception from the assigned UL CL, a merging rule confirmation message that confirms the one or more rules of the plurality of traffic merging rules.

Example 14 may include the method of example 13 and/or some other example herein, further comprising transmitting an ICN interest request to one or more ICN routers to retrieve cached ICN data, based on naming information associated with the cached ICN data.

Example 15 may include the method of example 14 and/or some other example herein, further comprising receiving, upon reception of a response message from an access and mobility management function (AMF), the response message that indicates the naming information associated with the cached ICN data.

Example 16 may include the method of example 15 and/or some other example herein, further comprising receiving the cached ICN data from an core network (CN) that caches the cached the ICN data; and transmitting, upon reception of the cached ICN data, the cached ICN data to the assigned UL CL.

Example 17 may include the method of examples 10-15 and/or some other example herein, wherein the method is performed by the ICN-PoA or a portion thereof.

Example 18 may include a method, comprising: decoding, upon reception of a notification message from a session management function (SMF), the notification message that indicates an information of an information centric networking point of attachment (ICN-PoA) for retrieving cached ICN data that correspond to an attach request or a service request that is requested by a user equipment (UE); and transmitting, to the ICN-PoA, a rule request message that indicates a plurality of traffic merging rules supported by the assigned UL CL.

Example 19 may include the method of example 18 and/or some other example herein, further comprising decoding, upon reception from the ICN-PoA, a rule check message that indicates one or more rules of the plurality of traffic merging rules, wherein the one or more rules are to be for ICN data traffic associated with the assigned UL CL and are selected by the ICN-PoA; and transmitting, to the ICN-PoA, a merging rule confirmation message that confirms the one or more rules of the plurality of traffic merging rules.

Example 20 may include the method of example 19 and/or some other example herein, further comprising determining that the one or more rules selected by the ICN-PoA are to be for the ICN data trafficking associated with the assigned UL CL.

Example 21 may include the method of example 19 and/or some other example herein, further comprising receiving, from the ICN-PoA, the cached ICN data, and wherein the cached ICN data include a plurality of ICN data packets.

Example 22 may include the method of example 21 and/or some other example herein, further comprising converting the plurality of ICN data packets to a plurality of internet protocol (IP) data packets.

Example 23 may include the method of example 22 and/or some other example herein, further comprising merging the plurality of IP data packets into a protocol data unit (PDU) session.

Example 24 may include the method of example 22 or 23 and/or some other example herein, further comprising transmitting the plurality of IP data packets or the PDU session to the UE.

Example 25 may include the method of examples 18-24 and/or some other example herein, wherein the method is performed by the assigned UL CL or a portion thereof Example 26 may include a method, comprising: requesting a protocol data unit (PDU) session establishment that includes an indication for information centric networking (ICN) based data trafficking; and receiving, from an assigned uplink classifier (UL CL), a plurality of IP data packets or the PDU session.

Example 27 may include the method of example 26 and/or some other example herein, further comprising transmitting an attach request or a service request to update the PDU session, and wherein the attach request or the service request includes information corresponding to retrieving cached ICN data.

Example 28 may include the method of examples 26-27 and/or some other example herein, wherein the method is performed by the UE or a portion thereof.

Example 29 may include an apparatus comprising means to perform one or more elements of a method described in or related to any of examples 1-28, or any other method or process described herein.

Example 30 may include one or more non-transitory computer-readable media comprising instructions to cause an electronic device, upon execution of the instructions by one or more processors of the electronic device, to perform one or more elements of a method described in or related to any of examples 1-28, or any other method or process described herein.

Example 31 may include an apparatus comprising logic, modules, and/or circuitry to perform one or more elements of a method described in or related to any of examples 1-28, or any other method or process described herein.

Example 32 may include a method, technique, or process as described in or related to any of examples 1-28, or portions or parts thereof.

Example 33 may include an apparatus comprising: one or more processors and one or more computer-readable media comprising instructions that, when executed by the one or more processors, cause the one or more processors to perform the method, technique, or process as described in or related to any of examples 1-28, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media (CRM) having instructions that, when executed by one or more processors, cause an information centric networking-control function (ICN-CF) to:
    assign, upon reception of a first message from an access and mobility management function (AMF), an ICN-point of attachment (ICN-PoA) to serve as a first ICN-aware user plane entity for a user equipment (UE) for ICN traffic routing;
    transmit a request to a session management function (SMF) to assign an uplink classifier (UL CL) for the ICN traffic routing;
    decode, upon reception of a response from the SMF to the request, the response to obtain information of an assigned UL CL by the SMF; and
    transmit, based on the decoded response, a notification message to the ICN-PoA to notify the ICN-PoA of the information of the assigned UL CL for merging traffic between the ICN-PoA and a protocol data unit (PDU) session that is associated with the assigned UL CL, if the response is to grant the assigned UL CL, wherein the ICN-PoA is coupled between the UL CL and one or more ICN routers configured to retrieve ICN data for the merging.

2. The one or more non-transitory CRM of claim 1, wherein the request to the SMF is a second request, and the first message includes a first request from the AMF, and wherein the first request is to request the ICN-CF to serve the UE for the ICN traffic routing.

3. The one or more non-transitory CRM of claim 2, wherein the second request is to include information with respect to capabilities and preferences of the assigned UL CL, and the capabilities and preferences include ICN traffic types and locations.

4. The one or more non-transitory CRM of claim 1, wherein the assigned UL CL is associated with the PDU session and is to handle the ICN data that are cached in an ICN-based data network (DN).

5. The one or more non-transitory CRM of claim 4, wherein the ICN data are to be cached in one or more edge nodes in a multi-access edge computing (MEC) network.

6. The one or more non-transitory CRM of claim 1, wherein the information of the assigned UL CL includes an identification of the assigned UL CL.

7. One or more non-transitory computer-readable media (CRM) having instructions that, when executed by one or more processors, cause an information centric networking-point of attachment (ICN-PoA) to:
receive, from an ICN control function (ICN-CF), an assignment to serve as a first ICN-aware user plane entity for a user equipment (UE) for ICN traffic routing;
decode, upon reception from the ICN CF, a notification message to indicate an identification of an assigned uplink classifier (UL CL) that is assigned to serve the UE for traffic merging between a protocol data unit (PDU) session and the ICN-PoA;
decode, upon reception from the assigned UL CL, a rule request message that indicates a plurality of traffic merging rules supported by the assigned UL CL; and
transmit, based on the decoded rule request message, a rule check message that indicates one or more rules of the plurality of traffic merging rules, wherein the one or more rules are to be for ICN data trafficking associated with the assigned UL CL,
wherein the ICN-PoA is coupled between the UL CL and one or more ICN routers configured to retrieve cached ICN data for the traffic merging.

8. The one or more non-transitory CRM of claim 7, wherein, upon execution, the instructions are further to cause the ICN-PoA to determine the one or more rules of the plurality of traffic merging rules, based on the decoded rule request message.

9. The one or more non-transitory CRM of claim 7, wherein, upon execution, the instructions are further to cause the ICN-PoA to decode, upon reception from the assigned UL CL, a merging rule confirmation message that confirms the one or more rules of the plurality of traffic merging rules.

10. The one or more non-transitory CRM of claim 9, wherein, upon execution, the instructions are further to cause the ICN-PoA to transmit an ICN interest request to the one or more ICN routers to retrieve the cached ICN data, based on naming information associated with the cached ICN data.

11. The one or more non-transitory CRM of claim 10, wherein, upon execution, the instructions are further to cause the ICN-PoA to receive, upon reception of a response message from an access and mobility management function (AMF), the response message that indicates the naming information associated with the cached ICN data.

12. The one or more non-transitory CRM of claim 11, wherein, upon execution, the instructions are further to cause the ICN-PoA to:
receive the cached ICN data from a core network (CN) that caches the cached the ICN data; and
transmit, upon reception of the cached ICN data, the cached ICN data to the assigned UL CL.

13. An access node (AN) that comprises an assigned uplink classifier (UL CL), the AN comprising:
memory circuitry; and
processing circuitry, coupled with the memory circuitry, the processing circuitry configured to:
decode, upon reception of a notification message from a session management function (SMF), the notification message that indicates an information of an information centric networking point of attachment (ICN-PoA) for retrieving cached ICN data that correspond to an attach request or a service request that is requested by a user equipment (UE);
transmit, to the ICN-PoA, a rule request message that indicates a plurality of traffic merging rules supported by the assigned UL CL; and
receive, from the ICN-POA, a rule check message that indicates one or more rules of the plurality of traffic merging rules, wherein the one or more rules are to be for ICN data traffic associated with the assigned UL CL and are selected by the ICN-PoA,
wherein the ICN-PoA is assigned to serve as a first ICN-aware user plane entity for the UE for ICN traffic routing, and
wherein the ICN-PoA is coupled between the UL CL and one or more ICN routers configured to retrieve the cached ICN data for the traffic merging.

14. The AN of claim 13, wherein the processing circuitry is further configured to:
decode the rule check message; and
transmit, to the ICN-PoA, a merging rule confirmation message that confirms the one or more rules of the plurality of traffic merging rules.

15. The AN of claim 14, wherein the processing circuitry is further configured to determine that the one or more rules selected by the ICN-PoA are to be for the ICN data trafficking associated with the assigned UL CL.

16. The AN of claim 14, wherein the processing circuitry is further configured to receive, from the ICN-PoA, the cached ICN data, and wherein the cached ICN data include a plurality of ICN data packets.

17. The AN of claim 16, wherein the processing circuitry is further configured to convert the plurality of ICN data packets to a plurality of internet protocol (IP) data packets.

18. The AN of claim 17, wherein the processing circuitry is further configured to merge the plurality of IP data packets into a protocol data unit (PDU) session.

19. The AN of claim 18, wherein the processing circuitry is further configured to transmit the plurality of IP data packets or the PDU session to the UE.

* * * * *